US012810644B2

(12) United States Patent
Kang et al.

(10) Patent No.: US 12,810,644 B2
(45) Date of Patent: Nov. 24, 2026

(54) METHOD AND APPARATUS FOR EXTRACTING AREA OF INTEREST IN A DOCUMENT

(71) Applicant: SAMSUNG SDS CO., LTD., Seoul (KR)

(72) Inventors: Han Hoon Kang, Seoul (KR); Jae Young Park, Seoul (KR); Hee Jung Kang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 653 days.

(21) Appl. No.: 18/232,142

(22) Filed: Aug. 9, 2023

(65) Prior Publication Data

US 2024/0078827 A1 Mar. 7, 2024

(30) Foreign Application Priority Data

Sep. 5, 2022 (KR) ........................ 10-2022-0112197
Nov. 15, 2022 (KR) ........................ 10-2022-0152955

(51) Int. Cl.

*G06V 30/416* (2022.01)
*G06V 30/19* (2022.01)
*G06V 30/413* (2022.01)

(52) U.S. Cl.

CPC ...... *G06V 30/416* (2022.01); *G06V 30/19093* (2022.01); *G06V 30/413* (2022.01)

(58) Field of Classification Search

None
See application file for complete search history.

(56) References Cited

U.S. PATENT DOCUMENTS 6,289,304 B1 * 9/2001 Grefenstette ......... G06F 16/345 715/236
11,023,675 B1 6/2021 Neervannan et al.
11,348,005 B2 5/2022 Navarrete Michelini et al.
12,300,008 B1 * 5/2025 Rangarajan ............ G06V 30/40
2009/0116736 A1 5/2009 Kumar et al.
2013/0198686 A1 8/2013 Kawai et al.
2018/0032870 A1 2/2018 Guan et al.
2018/0039907 A1 2/2018 Kraley
2021/0374168 A1 12/2021 Kulkarni et al.

OTHER PUBLICATIONS

Communication dated Aug. 18, 2026, issued by the Korean Ministry of Intellectual Property in Korean Application No. 10-2022-0152955.

* cited by examiner

*Primary Examiner* — Andrew H Lam
(74) *Attorney, Agent, or Firm* — Sughrue Mion, PLLC

(57) ABSTRACT

A method for extracting an area of interest in a document is provided. The method may comprise extracting one or more target pages from a document composed of a plurality of pages and extracting an area of interest including a plurality of sentences from a target page based on a first part-of-speech characteristic and a sentence characteristic of the target page.

19 Claims, 15 Drawing Sheets

51

| p | f1 | f2 | f3 | f4 | f5 | f6 | f7 | f8 | classification value |
|---|---|---|---|---|---|---|---|---|---|
| 1 | i/ ∑i | i+1/ ∑i | i+2/ ∑i | i+3/ ∑i | i+4/ ∑i | i+5/ ∑i | 5 | 0 | first type |
| 2 | j/ ∑j | j+1/ ∑j | j+2/ ∑j | j+3/ ∑j | j+4/ ∑j | j+5/ ∑j | 10 | 5 | second type |
| 3 | k/ ∑k | k+1/ ∑k | k+2/ ∑k | k+3/ ∑k | k+4/ ∑k | k+5/ ∑k | 20 | 5 | third type |
| 4 | l/ ∑l | l+1/ ∑l | l+2/ ∑l | l+3/ ∑l | l+4/ ∑l | l+5/ ∑l | 25 | 5 | third type |
| 5 | ... | | | | | | | | |

52

| p | f9 | f10 | f11 | f12 | f13 | classification value |
|---|---|---|---|---|---|---|
| 1 | 3 | i1, i2, i3... | m1, m2, m3... | a1, a2, a3... | e1, e2, e3... | first type |
| 2 | 7 | j1, j2, j3... | n1, n2, n3... | b1, b2, b3... | f1, f2, f3... | second type |
| 3 | 15 | k1, k2, k3... | o1, o2, o3... | c1, c2, c3... | g1, g2, g3... | third type |
| 4 | 20 | l1, l2, l3... | p1, p2, p3.. | d1, d2, d3... | h1, h2, h3... | third type |
| 5 | ... | | | | | |

FIG. 5A

6a

| p | f1 | f2 | f3 | f4 | f5 | f6 | f7 | f8 | classification value |
|---|---|---|---|---|---|---|---|---|---|
| 1 | 1 | 2 | 0 | 0 | 0 | 0 | 5 | 0 | first type |

(frequency for each part-of-speech)

6b

| p | f1 | f2 | f3 | f4 | f5 | f6 | f7 | f8 | classification value |
|---|---|---|---|---|---|---|---|---|---|
| 1 | 0.33 | 0.66 | 0 | 0 | 0 | 0 | 5 | 0 | first type |

(normalization for frequency)

FIG. 6

8a

| p | f1 | f2 | f3 | f4 | f5 | f6 | classification value |
|---|---|---|---|---|---|---|---|
| 1 | i/ ∑i | i+1/ ∑i | i+2/ ∑i | True | False | 4 | first type |
| 2 | j/ ∑j | j+1/ ∑j | j+2/ ∑j | True | False | 3 | first type |
| 3 | k/ ∑k | k+1/ ∑k | k+2/ ∑k | False | True | 10 | second type |
| 4 | l/ ∑l | l+1/ ∑l | l+2/ ∑l | False | True | 15 | second type |
| 5 | ... | | | | | | |

FIG. 8

6a

| p | f1 | f2 | f3 | f4 | f5 | f6 | classification value |
|---|---|---|---|---|---|---|---|
| 1 | 3 | 0 | 0 | True | False | 4 | first type |

(frequency for each characteristic value)

6b

| p | f1 | f2 | f3 | f4 | f5 | f6 | classification value |
|---|---|---|---|---|---|---|---|
| 1 | 1.0 | 0 | 0 | True | False | 4 | first type |

(normalization for frequency)

FIG. 9

12a

| sentence | separation or not |
|---|---|
| sentence1 | first class |
| sentence2 | second class |
| sentence3 | second class |
| sentence4 | second class |
| sentence5 | first class |
| sentence6 | second class |
| sentence7 | second class |

area of interest 1

12b

| sentence | separation or not |
|---|---|
| sentence1 | first class |
| sentence2 | second class |
| sentence3 | second class |
| sentence4 | second class |

area of interest 2

12c

| sentence | separation or not |
|---|---|
| sentence5 | first class |
| sentence6 | second class |
| sentence7 | second class |

FIG. 11

METHOD AND APPARATUS FOR EXTRACTING AREA OF INTEREST IN A DOCUMENT

CROSS-REFERENCE TO RELATED APPLICATION

This application claims priority from Korean Patent Application No. 10-2022-0112197 filed on Sep. 5, 2022, in the Korean Intellectual Property Office, and Korean Patent Application No. 10-2022-0152955 filed on Nov. 15, 2022, in the Korean Intellectual Property Office, and all the benefits accruing therefrom under 35 U.S.C. 119, the contents of which in its entirety are herein incorporated by reference.

BACKGROUND

1. Technical Field

The present disclosure relates to a method and apparatus for extracting an area of interest in a document including a plurality of pages, and more particularly, to a method for extracting an area of interest in a document, which is capable of extracting a region of interest by removing unnecessary pages based on linguistic characteristics in a document including a plurality of pages, and a system to which the method is applied.

2. Description of the Related Art

One document may include several pages, and additional pages such as a cover page, a table of contents, and attachments may be included as well as a text ultimately intended to be expressed in the document.

In addition, since paragraphs may include multiple themes even within the main text page which is highly useful for information because of including a large number of meaningful sentences, it is necessary to separate the page into an area of units of paragraph or a specific area and use it appropriately for the purpose.

Therefore, it is possible to separate the specific area within a document by utilizing a rule-based method such as word distribution within a page, whether a specific word is included or not, and expression matching using a regular expression. However, the methods may appropriately separate the specific area in a specific document for which analysis has been completed, but have a limitation in that a new rule or pattern should be added each time when targeting a new type of document for which analysis has not been completed.

Accordingly, in a method for separating a specific area in a document, a technique capable of reducing the time required to manually construct a rule or pattern for a new type of document is required.

SUMMARY

Aspects of the present disclosure provide a method and apparatus capable of extracting an area of interest without generating a new rule or pattern for a new type of document.

Aspects of the present disclosure also provide a method and apparatus for extracting an area within a document capable of extracting a specific page within a document using linguistic characteristics extracted from units of page.

Aspects of the present disclosure also provide a method and apparatus capable of extracting an area of interest within a specific page using linguistic characteristics extracted from units of sentence.

Aspects of the present disclosure also provide a method and apparatus for extracting an area of interest in a document capable of accurately extracting an area of interest using similarities between sentences.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to the present exemplary embodiment, the time required to manually construct a new rule or pattern involved in a process of extracting an area of interest from a new type of document may be reduced.

According to the present exemplary embodiment, since an area of interest to be separated may be extracted from any type of document, usability and convenience may be improved.

According to the present exemplary embodiment, accuracy and precision of an extracted area may be improved by extracting an area of interest using similarity between sentences as well as linguistic characteristics of units of page or sentence.

According to an aspect of the inventive concept, there is a method for extracting an area of interest in a document performed by a computing device. The method may comprise extracting one or more target pages from a document including a plurality of pages and extracting an area of interest including a plurality of sentences from a target page based on a first part-of-speech characteristic and a sentence characteristic of the target page.

In some embodiments, extracting of the one or more target pages may include generating a second part-of-speech characteristic and a page characteristic for each of the plurality of pages and extracting the target page using the second part-of-speech characteristic and the page characteristic.

In some embodiments, the second part-of-speech characteristic may include one or more characteristics of a distribution ratio of a noun, a distribution ratio of a number, a distribution ratio of a conjunction, a distribution ratio of a definite article, a distribution ratio of a verb, and a distribution ratio of an adjective.

In some embodiments, the page characteristic may include one or more characteristics of a number of words in a page and whether a number is included in a beginning word of a sentence within the page.

In some embodiments, the extracting of the one or more target pages may further include generating an image characteristic for each of the plurality of pages.

In some embodiments, the image characteristic may include one or more characteristics of a font size of a text area and an arrangement form of the text area in a page.

In some embodiments, extracting of the target page using the second part-of-speech characteristic and the page characteristic may include classifying types of the plurality of pages by inputting the second part-of-speech characteristic, the page characteristic, and the image characteristic to a page classification model and extracting the target page based on the types of the plurality of pages.

In some embodiments, the types of the plurality of pages may include a cover page, a table of contents, and a body.

In some embodiments, the page classification model may be a model learned using normalized values of frequency for each part-of-speech calculated based on the second part-of-speech characteristic, the page characteristic, and the image characteristic.

In some embodiments, the first part-of-speech characteristic may include one or more characteristics of a distribution ratio of a noun, a distribution ratio of a verb, and a distribution ratio of an adjective.

In some embodiments, the sentence characteristic may include one or more characteristics of whether a number is included in a beginning word of a sentence, whether a punctuation mark is present in the sentence, and a number of words in the sentence.

In some embodiments, extracting of the area of interest may include classifying a plurality of sentences included in the target page into a plurality of classes by inputting the first part-of-speech characteristic and the sentence characteristic to a sentence classification model and extracting the area of interest based on the plurality of classified classes.

In some embodiments, extracting of the area of interest based on the plurality of classified classes may include extracting, as the interest of interest, a combination of a sentence classified as a first class and a sentence classified as a second class through the sentence classification model.

In some embodiments, the first class may be a title, and the second class may be a body of the title.

In some embodiments, extracting of the area of interest may further comprise determining a similarity between a first sentence and a second sentence included in the area of interest and removing the second sentence from the area of interest based on a determination that the similarity between the first sentence and the second sentence is a reference value or less.

In some embodiments, the first sentence may be a sentence belonging to the first class, and the second sentence may be a sentence belonging to the second class.

In some embodiments, the first sentence and the second sentence may be sentences belonging to a same class.

In some embodiments, the sentence classification model may be a model learned using normalized values of a frequency of each part-of-speech calculated based on the first part-of-speech characteristic and the sentence characteristic.

According to yet another aspect of the inventive concept, there is a provided computer system for extracting an area of interest in a document. The system may comprise at least one processor and at least one memory configured to store instructions, wherein the instructions, when executed by the at least one processor, causes the at least one processor to perform extracting one or more target pages from a document including a plurality of pages; and extracting an area of interest including a plurality of sentences from a target page based on a first part-of-speech characteristic and a sentence characteristic of the target page.

In some embodiments, the instructions may further cause the processor to perform removing any one of a first sentence and a second sentence from the area of interest based on a determination that a similarity between the first sentence and the second sentence belonging to the area of interest is a reference value or less.

BRIEF DESCRIPTION OF THE DRAWINGS

The above and other aspects and features of the present disclosure will become more apparent by describing in detail exemplary embodiments thereof with reference to the attached drawings, in which:

FIGS. 5A and 5B are exemplary diagrams for explaining some operations illustrated in FIG. 2;

FIG. 6 is an exemplary diagram of a method for learning a page classification model, which may be referred to in some exemplary embodiments of the present disclosure;

FIG. 8 is an exemplary diagram for explaining some operations illustrated in FIG. 7;

FIG. 9 is an exemplary diagram of a method for learning a sentence classification model, which may be referred to in some exemplary embodiments of the present disclosure;

FIGS. 11, 12A, and 12B are exemplary diagrams for explaining some operations illustrated in FIG. 10.

DETAILED DESCRIPTION

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In describing the present disclosure, when it is determined that the detailed description of the related well-known configuration or function may obscure the gist of the present disclosure, the detailed description thereof will be omitted.

Unless otherwise defined, terms used in the following embodiments (including technical and scientific terms) may be used in a meaning that can be commonly understood by those of ordinary skill in the art to which the present disclosure belongs, but this may vary depending on the intention of engineers working in the related field, precedents, and the emergence of new technologies. Terminology used in this disclosure is for describing the embodiments and is not intended to limit the scope of the disclosure.

Expressions in the singular number used in the following embodiments include plural concepts unless the context clearly indicates that the singular number is specified. Also, plural expressions include singular concepts unless clearly specified as plural in context.

In addition, terms such as first, second, A, B, (a), and (b) used in the following embodiments are only used to distinguish certain components from other components, and the terms does not limit the nature, sequence, or order of the components.

Hereinafter, embodiments of the present disclosure are described with reference to the accompanying drawings.

Figure 1:
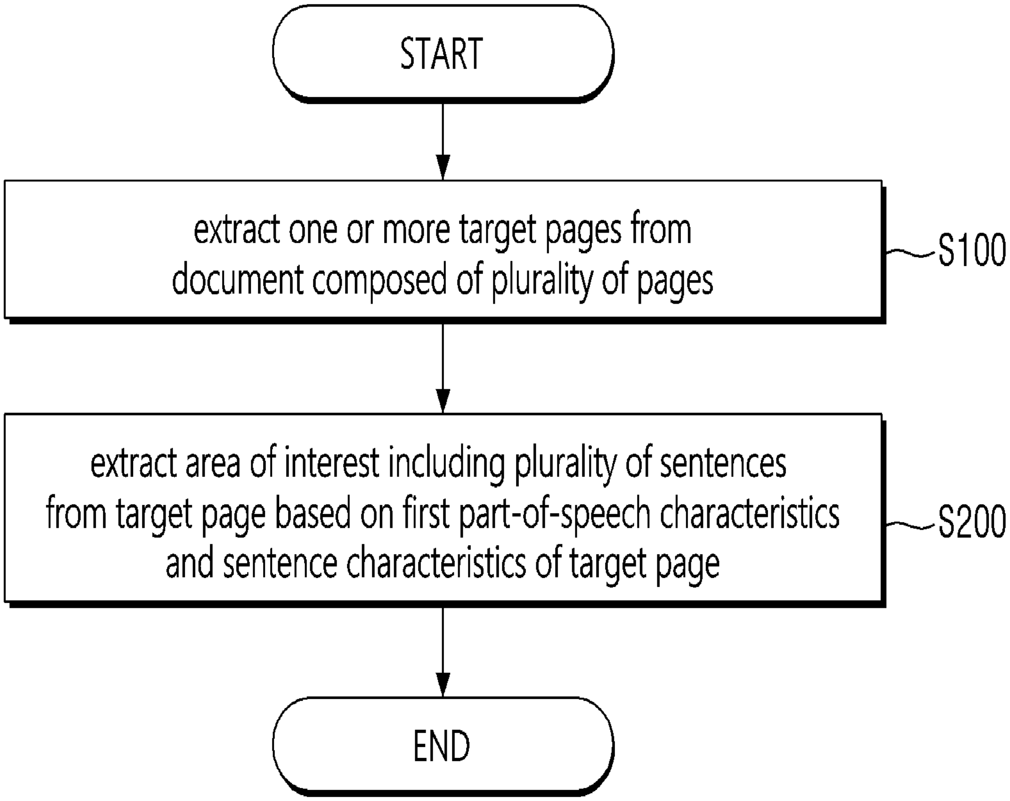
FIG. 1 is a flowchart illustrating a method for extracting an area of interest in a document according to an exemplary embodiment of the present disclosure.

FIG. 1 is a flowchart illustrating a method for extracting an area of interest in a document according to an exemplary embodiment of the present disclosure. However, this is only an exemplary embodiment for achieving the object of the present disclosure, and some steps may also be added or deleted as needed.

As illustrated in FIG. 1, a method for extracting an area of interest in a document according to the present exemplary embodiment starts at step S100 in which one or more target pages are extracted from a document including a plurality of pages. In this case, the target page may refer to a page including contents that may be utilized for various purposes. More specifically, a page of high importance may be extracted or classified as the target page in one document in which a plurality of pages of low importance, such as a cover page and a table of contents, and a plurality of pages of high importance, such as a body, exist.

A detailed description of the method for extracting the target page from the document will be described later with reference to FIGS. 2 to 6.

In step S200, an area of interest including a plurality of sentences in the target page may be extracted based on first parts of speech characteristics and sentence characteristics of the target page. In this case, the area of interest is a semantic unit that a user wants to separate from a specific document, and may mean a set of sentences in the form of a title and sentences describing the contents for the corresponding title.

In this case, the first part-of-speech characteristics may be characteristics corresponding to a part-of-speech extracted from a sentence included in one target page using a part-of-speech tagger. More specifically, the first part-of-speech characteristics may include one or more characteristics of a distribution ratio of nouns, a distribution ratio of verbs, and a distribution ratio of adjectives.

In addition, the sentence characteristics may include one or more characteristics of whether a number is included in a beginning word of the sentence, whether punctuation marks are present in the sentence, and the number of words in the sentence.

A detailed description of the method for extracting the area of interest from the target page will be described later with reference to FIGS. 7 to 9.

Meanwhile, prior to step S100 of extracting the target page from the document, a step of pre-processing an electronic document in a binary form into a form readable by a computing device may be performed. That is, the electronic document may be converted into a text form, and typos or spaces in the text may be corrected according to a user's need.

However, information on the size or arrangement of characters may not be obtained through the conversion of the electronic document into text. Accordingly, the electronic document may be converted into an image form, and an image of an area including the text may be extracted. Furthermore, the target page may be extracted using characteristic information of the image of the area including the text, and furthermore, the area of interest may be extracted.

Figure 2:
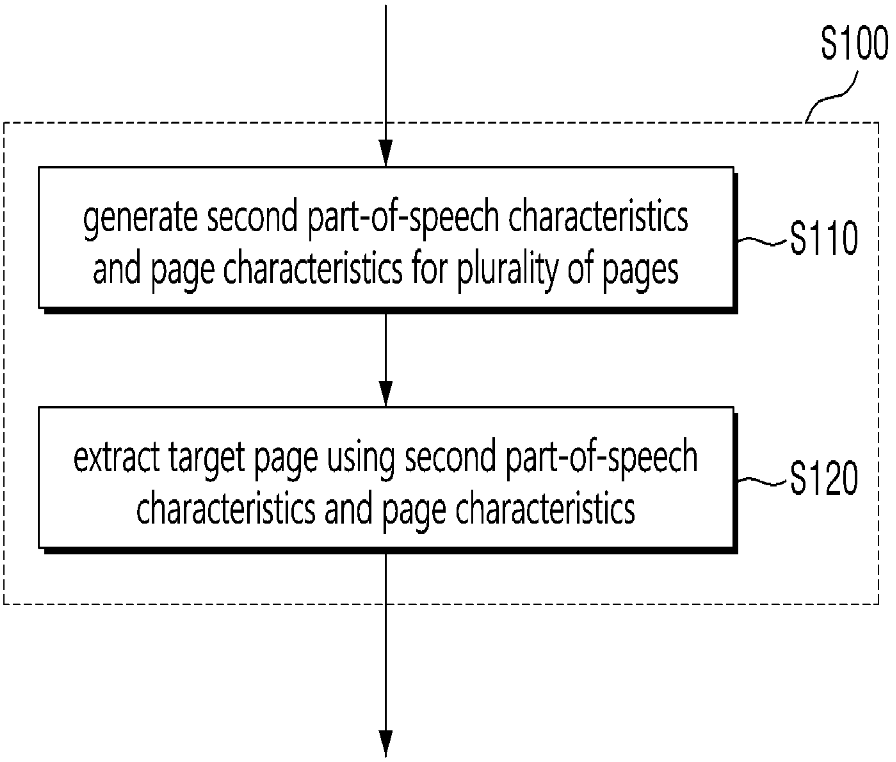
FIG. 2 is a detailed flowchart for explaining some operations illustrated in FIG. 1.

FIG. 2 is a detailed flowchart for explaining some operations illustrated in FIG. 1.

As illustrated in FIG. 2, step S100 of extracting the target page from the document including the plurality of pages may include step S110 of generating second part-of-speech characteristics and page characteristics for the plurality of pages, and step S120 of extracting the target page by using the second part-of-speech characteristics and the page characteristics.

In this case, the second part-of-speech characteristics may be characteristics corresponding to a part-of-speech extracted from a sentence included in one page using a part-of-speech tagger. More specifically, the second part-of-speech characteristics may include one or more characteristics of a distribution ratio of nouns, a distribution ratio of numbers, a distribution ratio of conjunctions, a distribution ratio of definite articles, a distribution ratio of verbs, and a distribution ratio of adjectives.

In addition, the page characteristics may include one or more characteristics of the number of words in the page and whether or not a number is included in a beginning word of a sentence included in the page.

Meanwhile, the above-described second part-of-speech characteristics and page characteristics are characteristics that may be generated in the page of the document on which the text conversion process has been performed, and information on the size or arrangement of characters may be unknown therefrom. Accordingly, it is necessary to perform a process of obtaining information on the font size or arrangement form (e.g., center alignment, left alignment, justification) through the image conversion process of the document.

In this case, the information on the font size or arrangement form in the page may include information on the location (x-axis, y-axis coordinates) and size (horizontal length, vertical length) of a text area image in the page. For example, the longer vertical length of the text area image in the page may mean a larger font size, and when an x-axis coordinate value of the text area image in the page matches the median value of a paper size, it may mean that the text area image is aligned in the center.

Accordingly, the step S100 of extracting a target page from a document including a plurality of pages may further include generating image characteristics for the plurality of pages. In this case, the image characteristics may include one or more characteristics of a font size and an arrangement form of a text area in a page. More specifically, the image characteristics may include one or more characteristics of the number of text area images, an x-axis coordinate value of the text area image, a y-axis coordinate value of the text area image, a horizontal length of the text area image, and a vertical length of the text area image. A detailed description of the method of extracting the target page using the information on the image characteristics will be described later with reference to FIGS. 5A and 5B.

Figure 3:
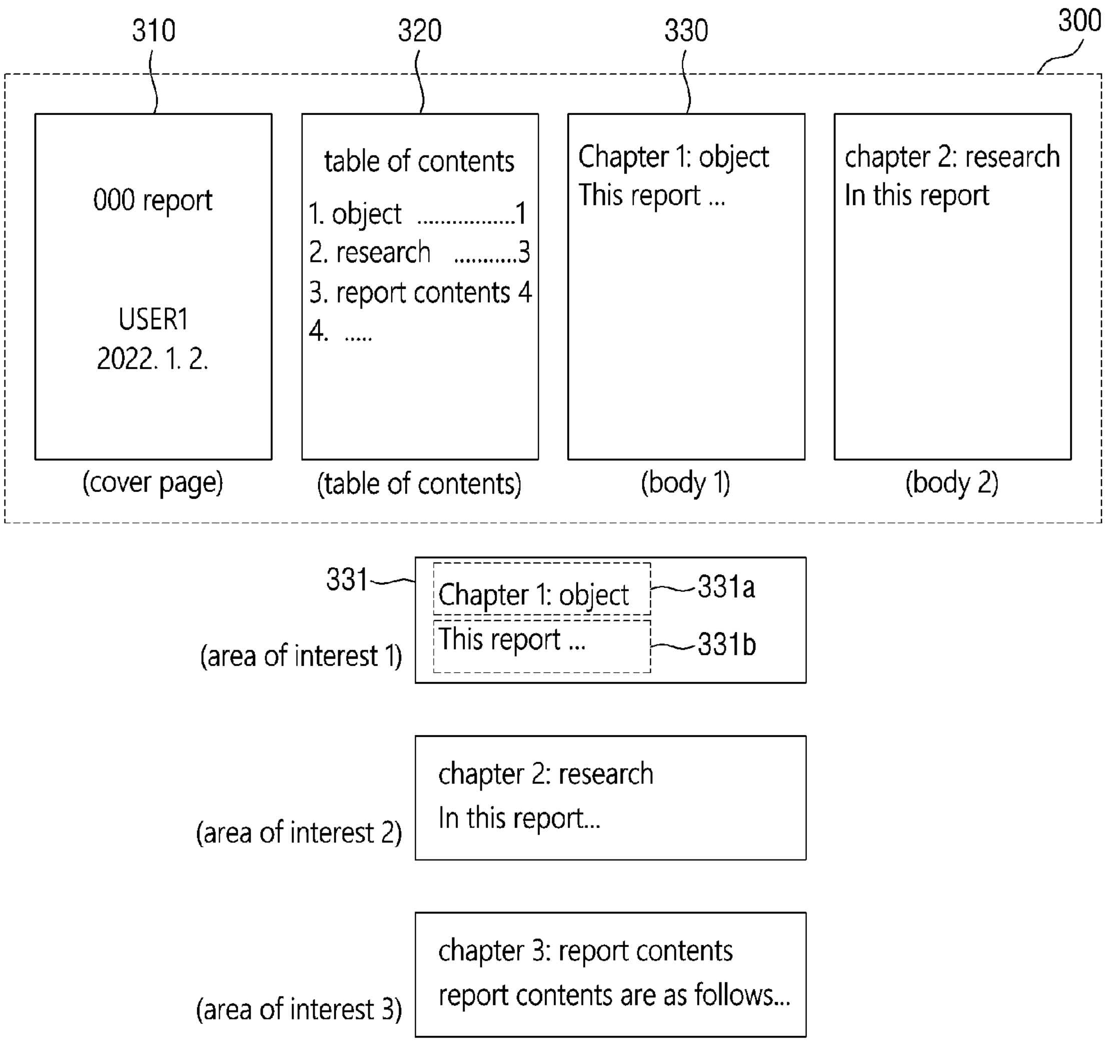
FIG. 3 is an exemplary diagram of a target page and an area of interest, which may be referred to in some exemplary embodiments of the present disclosure.

FIG. 3 is an exemplary diagram of a target page and an area of interest, which may be referred to in some exemplary embodiments of the present disclosure.

As illustrated in FIG. 3, the types of pages included in one document 300 may be classified into a cover page 310, a table of contents 320, and a body 330. In this case, the page 310 corresponding to the cover page has characteristics such as a relatively small number of words included in the page, a high distribution ratio of nouns among parts of speech included in the page, and alignment of sentences in a center alignment. In addition, the page 320 corresponding to the table of contents has characteristics such as a large number of sentences starting with numbers, a relatively large number of numbers and punctuation marks, and consecutively arranged punctuation marks.

In addition, one target page may include a plurality of areas of interest, and the type of sentence included in any one area of interest 331 belonging to the plurality of areas of interest may be separated into a title and contents for the title. In this case, a sentence 331*a* corresponding to the title has characteristics such as a relatively small number of words included in the sentence, a sentence starting with a number in many cases, and no punctuation marks in the sentence. In addition, a sentence 331*b* corresponding to the contents for the title has characteristics such as a relatively large number of words included in the sentence and a relatively small difference between distribution ratios for each part-of-speech.

Accordingly, a target page including an area of interest may be extracted using part-of-speech characteristics and page characteristics generated in units of page included in the document. Furthermore, the area of interest may be extracted using parts of speech characteristics and sentence characteristics generated in units of sentence included in the target page.

However, the types of pages and types of sentences included in the document according to the present disclosure are not limited to those illustrated in FIG. 3 and may include various types. For example, the types of pages included in the document may include annexed papers, appendices, references, and the like.

Figure 4:
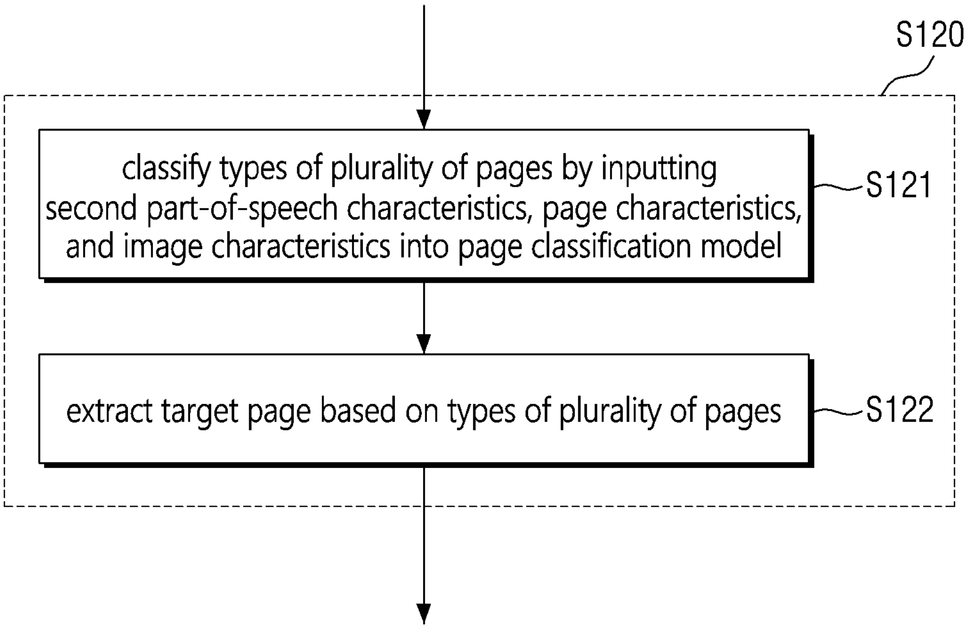
FIG. 4 is a detailed flowchart for explaining some operations illustrated in FIG. 2.

FIG. 4 is a detailed flowchart for explaining some operations illustrated in FIG. 2. However, this is only an exemplary embodiment for achieving the object of the present disclosure, and some steps may also be added or deleted as needed.

As illustrated in FIG. 4, in step S121, a plurality of types of pages may be classified by inputting part-of-speech characteristics, page characteristics, and image characteristics to a page classification model. Then, in step S122, a target page may be extracted based on the types of the plurality of pages.

Figure 5B:
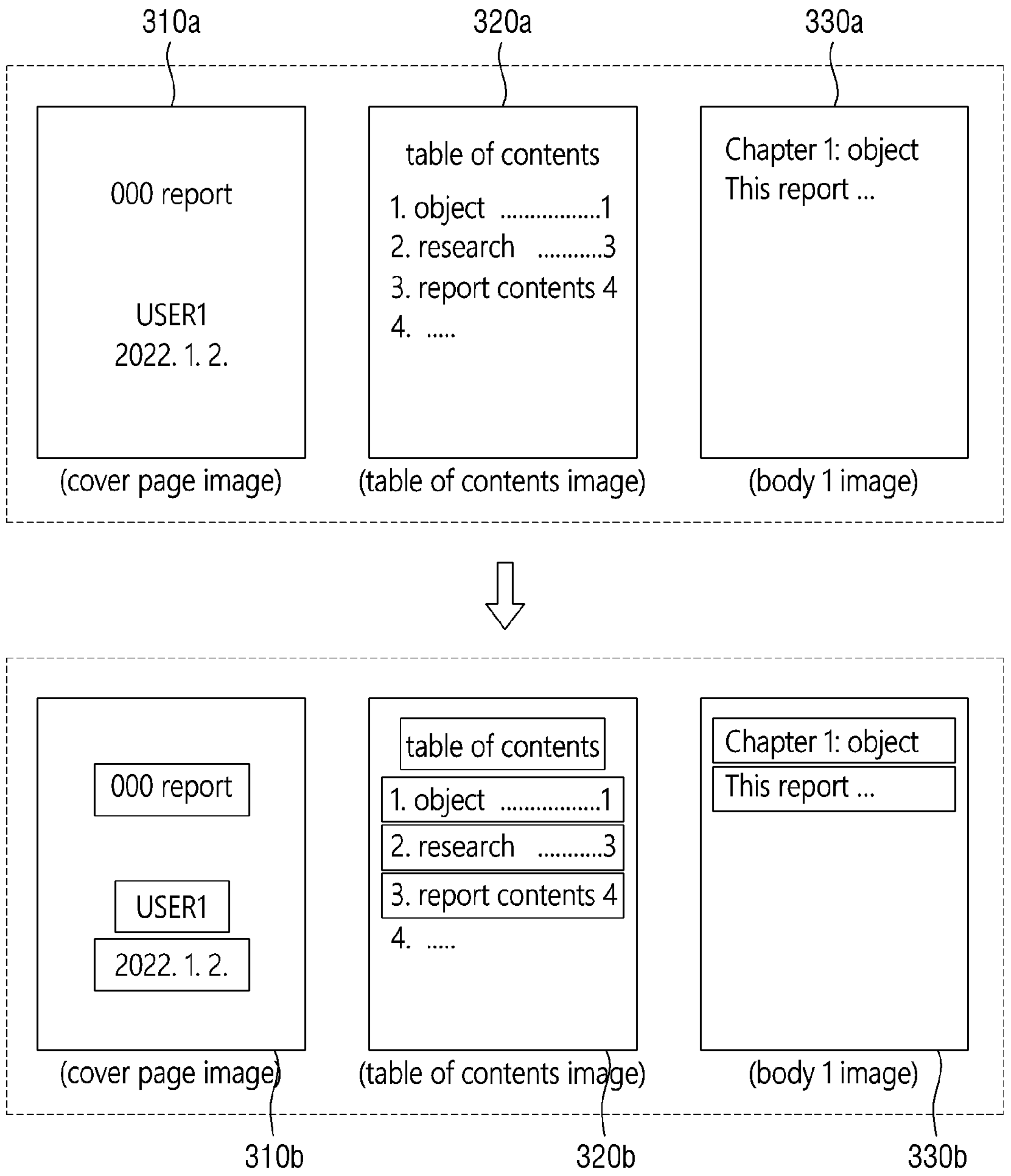

FIGS. 5A and 5B are exemplary diagrams for explaining some operations illustrated in FIG. 2. More specifically, FIGS. 5A and 5B are exemplary diagrams for explaining an operation of classifying types of page using part-of-speech characteristics, page characteristics, and image characteristics generated in units of page.

First, a method for classifying types of page using the part-of-speech characteristics and page characteristics generated in units of page will be described.

Referring to a data set 51 illustrated at the top of FIG. 5A, nouns, numbers, conjunctions, definite articles, verbs, and adjectives may be extracted by using the part-of-speech tagger, and the types of page may be classified using the characteristics of the extracted parts of speech. In this case, the type of the page may be classified using page characteristics generated for each unit of page.

For example, when a distribution ratio f1 of nouns of a first page exceeds a reference value, the first page may be classified as a first type (cover page) using the distribution ratio f1 of nouns, a distribution ratio f2 of numbers, a distribution ratio f3 of conjunctions, a distribution ratio f4 of definite articles, a distribution ratio f5 of verbs, and a distribution ratio f6 of adjectives generated for each unit of page p. In addition, when the distribution ratio f2 of numbers of a second page exceeds the reference value, the second page may be classified as a second type (table of contents).

Furthermore, using the number of words f7 in a page generated in units of page p and whether a number is included in a beginning word of a sentence included in the page f8, when the number f7 of words in the first page is the reference value or less, the first page may be classified as a first type (cover page), and when a number is included in the beginning word of the sentence included in the second page, the second page may be classified as a second type (table of contents).

Next, a method for classifying the type of a page using image characteristics generated in units of a page will be described. FIG. 5B is an exemplary diagram of a state in which a plurality of pages in a document are converted into images and an image of a text area is identified.

As illustrated at the top of FIG. 5B, in order to obtain information (e.g., font size, arrangement type) that may not be recognized through the text conversion, the cover page 310, the table of contents page 320, and the body page 330 in the document 300 illustrated in FIG. 3 may be converted into a cover page image 310*a*, a table of contents image 320*a*, and a body image 330*a* through image conversion. In addition, an image of a text area may be identified in the converted image.

However, the text area images in a cover page image 310*b*, a table of contents image 320*b*, and a body image 330*b* illustrated at the bottom of FIG. 5B are displayed in a box shape and are separated from each other, but it should be noted that the box-shaped display is only used to indicate that the text area image is identified, and is not actually displayed during the process of extracting the target page from the document.

Referring back to FIG. 5A, as in a data set 52 exemplified at the bottom of FIG. 5A, a type of page may be classified using image characteristics generated for each unit of page in the document on which the image conversion process is performed.

For example, when the number f9 of images of text area in a first page is a reference value or less, when the number of images of text area having the same x-axis coordinate value f10 of the image of text area is the reference value or more, or when a vertical length f13 of the image of text area is the reference value or more, the first page may be classified as a first type (cover page) using the number f9 of images of text area, the x-axis coordinate value f10 of the image of the text area, a y-axis coordinate value f11 of the image of the text area, a horizontal length f12 of the image of the text area, and the vertical length f13 of the image of the text area generated for each unit of page p.

In addition, when the number f9 of images of text area in a second page is within a preset range or when the y-axis coordinate value f11 of the image of text area shows a uniform distribution, the second page may be classified as a second type (table of contents). Furthermore, when the y-axis coordinate value f11 of the image of text area in a third page is the reference value or less or when there are multiple images of text area having the x-axis coordinate value f10 of the reference value or less, the third page may be classified as a third type (body).

Meanwhile, the data sets 51 and 52 illustrated in FIG. 5 may be a configuration format of a learning data set for machine learning of a page classification model. In this case, since the page classification model may be learned in a supervised learning method, a classification value indicating a page type corresponding to a correct answer may be included in the learning data set. That is, when the classification value for a page is of the first type, it may mean that the page is a page corresponding to the cover page, when the classification value for a page is of the second type, it may mean that the page is a page corresponding to the table of contents, and when the classification value for a page is of the third type, it may mean that the page is a page corresponding to the body.

However, the learning data set for machine learning of the page classification model is not limited to the contents illustrated in FIGS. 5A and 5B and may further include various parts of speech characteristics and page characteristics.

FIG. 6 is an exemplary diagram of a method for learning a page classification model, which may be referred to in some exemplary embodiments of the present disclosure.

As illustrated in FIG. 6, based on the part-of-speech characteristics f1, f2, f3, f4, f5, and f6 generated in step S121, a frequency 6*a* for each part-of-speech may be calculated, and the calculated frequency of each part-of-speech may be normalized. Furthermore, the page classification model may be learned using the normalized values 6*b*, the page characteristics f7 and f8, and the image characteristics. Those skilled in the art will already be familiar with the normalization process and the machine learning algorithm, and then a detailed description thereof will be omitted.

Figure 7:
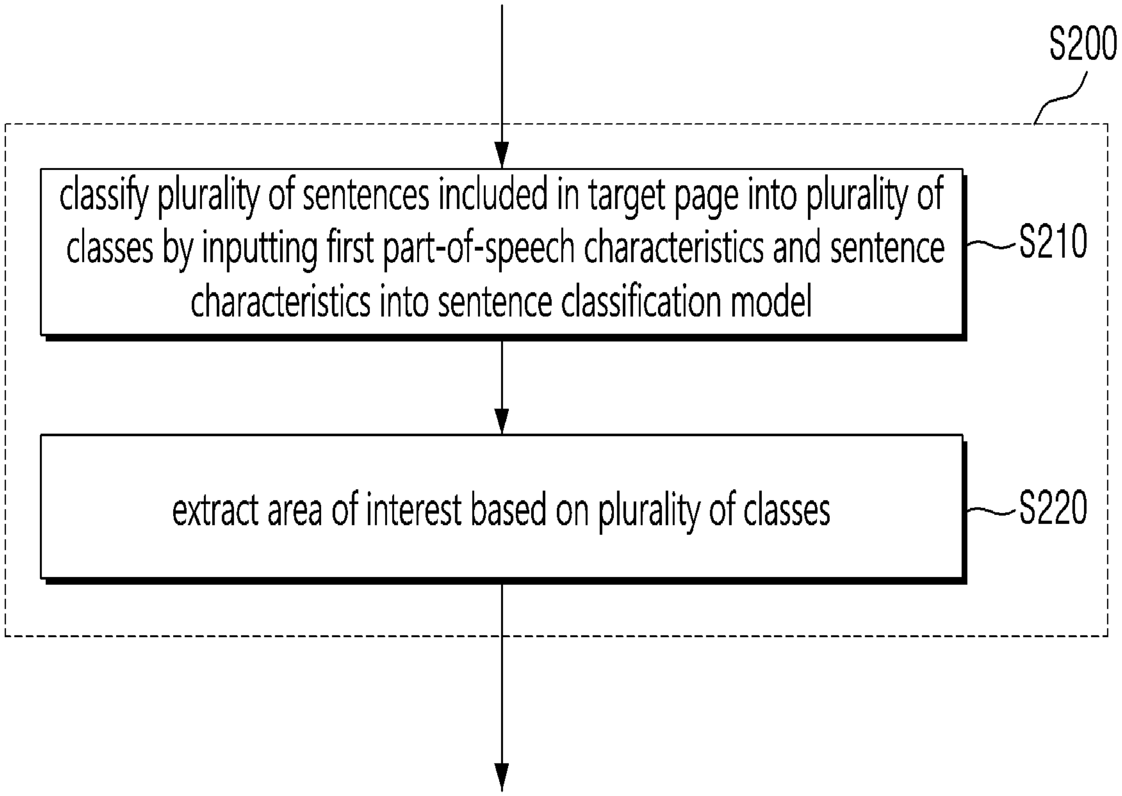
FIG. 7 is a detailed flowchart for explaining some operations illustrated in FIG. 1.

FIG. 7 is a detailed flowchart for explaining some operations illustrated in FIG. 1. However, this is only an exemplary embodiment for achieving the object of the present disclosure, and some steps may also be added or deleted as needed.

As illustrated in FIG. 7, step S200 of extracting an area of interest may include step S210 of classifying a plurality of sentences included in the target page into a plurality of classes by inputting first part-of-speech characteristics and sentence characteristics of the target page into a sentence classification model, and step S220 of extracting the area of interest based on the plurality of classes.

In this case, the first part-of-speech characteristics may be characteristics corresponding to a part-of-speech extracted from a sentence included in one target page using a part-of-speech tagger. More specifically, the first part-of-speech characteristics may include one or more characteristics of a distribution ratio of nouns, a distribution ratio of verbs, and a distribution ratio of adjectives.

In addition, the sentence characteristics may include one or more characteristics of whether punctuation marks are present in the sentence, the number of words in the sentence, and whether a number is included in a beginning word of the sentence included in the target page.

Furthermore, the area of interest may be an area including a combination of a sentence classified as a first class and a sentence classified as a second class through the sentence classification model.

In this case, the first class may be a title, and the second class may be a body of the title. However, in the present disclosure, the terms 'title' and 'body of the title' are used as described above for convenience of understanding, but the scope of the present disclosure is not limited thereto. For example, the first class may be a clause included in a body of a document such as a contract or legal document, and the second class may be a description of the clause. In addition, the first class may be claims included in a body of various documents related to patents (e.g., applications, claims, and other documents related to trials and litigation), and the second class may be a description of the claims.

Accordingly, an area of interest including clauses (e.g., Article ○ ○, Paragraph ○ ○, and Item ○ ○) and a description of clauses in documents such as contracts and legal documents may be extracted. In addition, an area of interest including claims (e.g., in claim ○ ○ and ○ ○) and a description of the claims in a document such as a patent application or a request for trial may be extracted.

In summary, contents included in some pages in a document may be classified into a first class corresponding to an upper category and a second class corresponding to a lower category according to various setting criteria. Hereinafter, for convenience of understanding, it is assumed that the first class is the title and the second class is the contents for the title.

FIG. 8 is an exemplary diagram for explaining some operations illustrated in FIG. 7. More specifically, FIG. 8 is an exemplary diagram for explaining a process of classifying a class of sentence using part-of-speech characteristics and sentence characteristics generated in units of sentence.

Referring to FIG. 8, nouns, verbs, and adjectives may be extracted using a part-of-speech tagger, and a class of sentence may be classified using the characteristics of the extracted parts of speech. In this case, the class of the sentence may be classified using sentence characteristics generated for each unit of sentence.

For example, when a distribution ratio f2 of verbs or a distribution ratio f3 of adjectives of a first sentence is a reference value or less, the first sentence may be classified as a first class (title) using a distribution ratio f1 of nouns, the distribution ratio f2 of verb, and the distribution ratio f3 of adjectives generated for each units of sentence s In addition, when a difference between the distribution ratios f1, f2, and f3 of the part-of-speech of the second sentence is the reference value or less, the second sentence may be classified as a second class (body of the title).

Furthermore, when a number is included in a beginning word of the first sentence, the first sentence may be classified as a first class (title) using whether the number is included in the beginning word of the sentence f4, whether there are punctuation marks in the sentence f7, and the number f6 of words in the sentence. In addition, when the punctuation mark in the second sentence exists at the end of the second sentence or the number f6 of words in the sentence exceeds the reference value, the second sentence may be classified as a second class (body of title).

Meanwhile, a data set 8*a* illustrated in FIG. 8 may be a configuration format of a learning data set for machine learning of a sentence classification model. A detailed description thereof will be omitted since it is similar to the contents for the page classification model described with reference to FIG. 6. In addition, the learning data set for machine learning of the sentence classification model is not limited to those illustrated in FIG. 8 and may further include various part-of-speech characteristics and sentence characteristics.

FIG. 9 is an exemplary diagram of a method for learning a sentence classification model, which may be referred to in some exemplary embodiments of the present disclosure.

As illustrated in FIG. 9, based on the part-of-speech characteristics f1, f2, and f3, a frequency 9*a* for each part-of-speech may be calculated, and the calculated frequency of each part-of-speech may be normalized. Furthermore, a sentence classification model may be learned using the normalized values 9*b* and page characteristics. Those skilled in the art will already be familiar with the normalization process and the machine learning algorithm, and then a detailed description thereof will be omitted.

Hereinafter, a method for accurately extracting an area of interest based on a similarity between sentences included in the area of interest will be described with reference to FIGS. 10 to 12B.

Figure 10:
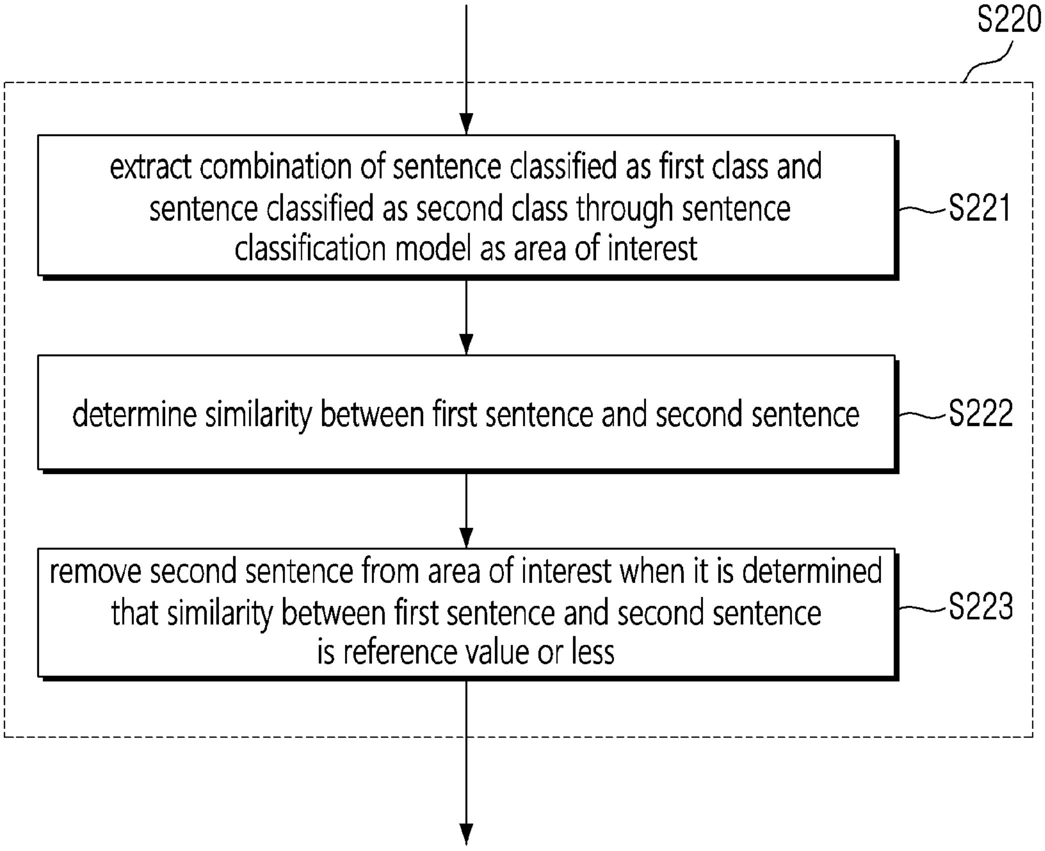
FIG. 10 is a detailed flowchart for explaining some operations illustrated with reference to FIG. 7.

FIG. 10 is a detailed flowchart for explaining some operations illustrated with reference to FIG. 7. However, this is only an exemplary embodiment for achieving the object of the present disclosure, and some steps may also be added or deleted as needed.

As illustrated in FIG. 10, step S220 of extracting an area of interest based on a plurality of classes may include step S221 of extracting a combination of the sentence classified as the first class and the sentence classified as the second class through the sentence classification model as an area of interest, step S222 of determining a similarity between the first sentence and the second sentence, step S223 of removing the second sentence from the area of interest and when the similarity between the first sentence and the second sentence is determined to be a reference value or less.

FIGS. 11 and 12 are exemplary diagrams for explaining some operations illustrated in FIG. 10.

Referring to the table 12*a* illustrated on the left side of FIG. 11, a plurality of sentences (sentences 1 to 7) included in the target page may be classified into a first class (sentence 1 and sentence 5) corresponding to the title and a second class (sentences 2 to 4, sentence 6, and sentence 7) corresponding to the body of the title through the sentence classification model. Accordingly, the plurality of sentences included in the target page may be separated into a first area of interest 12*b* including the sentences 1 to 4 and a second area of interest 12*c* including the sentences 5 to 7 based on the first class.

That is, the first area of interest 12*b* and the second area of interest 12*c* may be areas including a combination of the sentences of the first class in the form of title and the sentences of the second class of the contents describing the title. In this case, the area of interest may not be accurately extracted because the plurality of sentences in the target page are classified based on part-of-speech characteristics and sentence characteristics corresponding to formal aspects of the sentences.

Accordingly, a technique for more accurately extracting an area of interest based on relevance or similarity between the plurality of sentences included in the target page is required.

Hereinafter, a method for more accurately extracting the area of interest through a process of removing either one of the first sentence and the second sentence from the area of interest when it is determined that a similarity between the first sentence and the second sentence included in the area of interest is the reference value or less will be described with reference to FIGS. 12A and 12B.

Figure 12A:
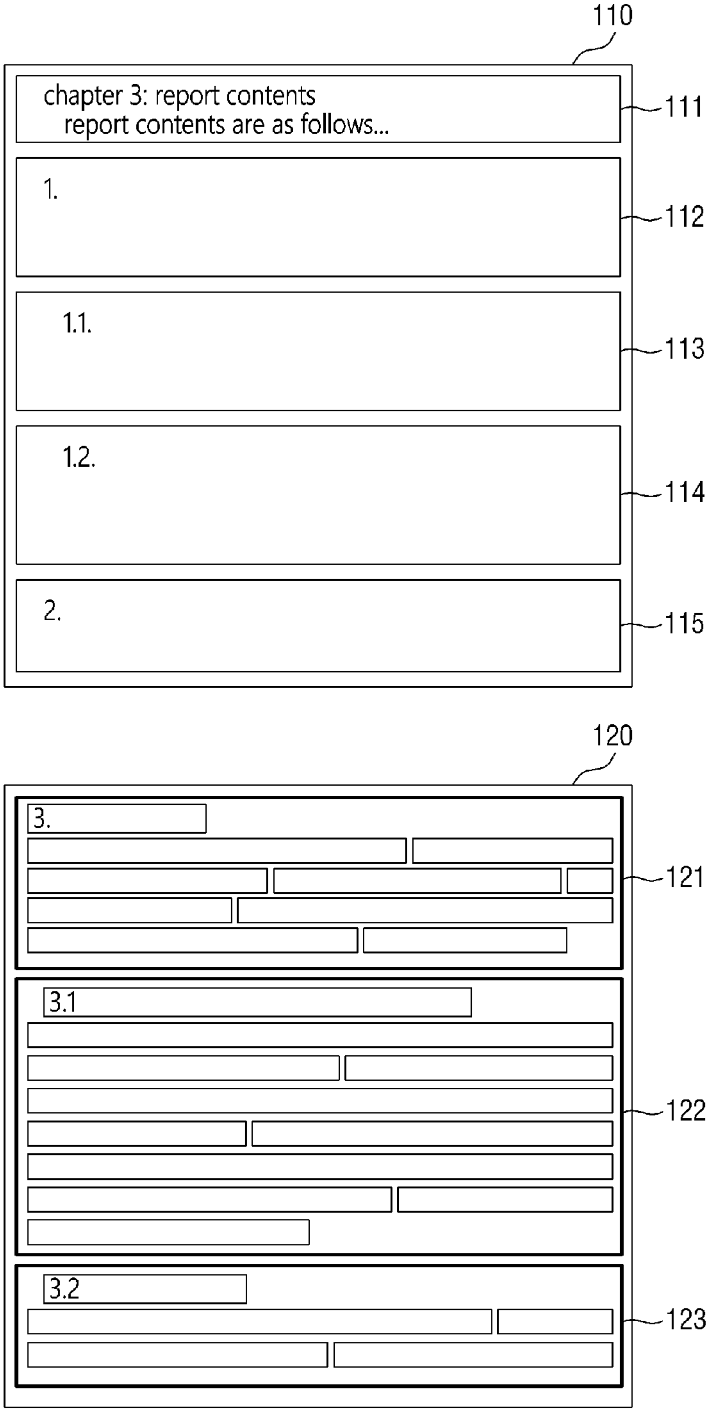

As illustrated in FIG. 12A, a plurality of target pages 110 and 120 may be extracted from a document including a plurality of pages through a page classification model. In addition, through the sentence classification model, a plurality of areas of interest 111, 112, 113, 114, and 115 may be extracted from the first target page 110 and a plurality of areas of interest 121 and 122 may be extracted from the second target page 120. Hereinafter, the second target page 120 on which a plurality of sentences included in the area of interest are visually illustrated will be mainly described.

In general, a number may be included in a starting word of a first sentence among a plurality of sentences included in the area of interest. For example, a first sentence of the plurality of areas of interest 121, 122, and 123 extracted from the second target page 120 may start with a number. Accordingly, the first sentence among the plurality of sentences included in the second target page 120 may be classified as a first class based on the sentence characteristics, and the plurality of areas of interest 121, 122, and 123 may be extracted by separating an internal area of the second target page 120 based on the sentences classified into the first class.

However, as an exception, there may be a sentence in which a number is included in a beginning word of a sentence among the plurality of sentences included in the specific area of interest, and there may be a case in which the sentence including the number in the beginning word of the sentence is a sentence of the second class. In this case, when the area of interest is extracted based only on the sentence characteristics, an area of interest to be extracted as one may be separated into two and extracted based on the sentence of the second class because the sentence of the second class is classified as the sentence of the first class.

Accordingly, when the similarity between the first sentence and the second sentence included in the area of interest is determined to be the reference value or less, a step of removing any one of the first sentence and the second sentence from the area of interest may be additionally performed.

In this case, the first sentence may be a sentence belonging to the first class, and the second sentence may be a sentence belonging to the second class. In addition, the first sentence and the second sentence may be sentences belonging to the same class.

That is, the area of interest may be more accurately extracted based on the similarity between the sentence in the form of the title and the sentence of the contents describing the title or the similarity between sentences of the contents describing the title.

Hereinafter, a method for accurately extracting an area of interest in the case in which there is a sentence including a number in a beginning word of a sentence among a plurality of sentences included in a specific area of interest, and the sentence including a number in the beginning word of the sentence is a sentence of the second class will be described with reference to FIG. 12B.

Figure 12B:
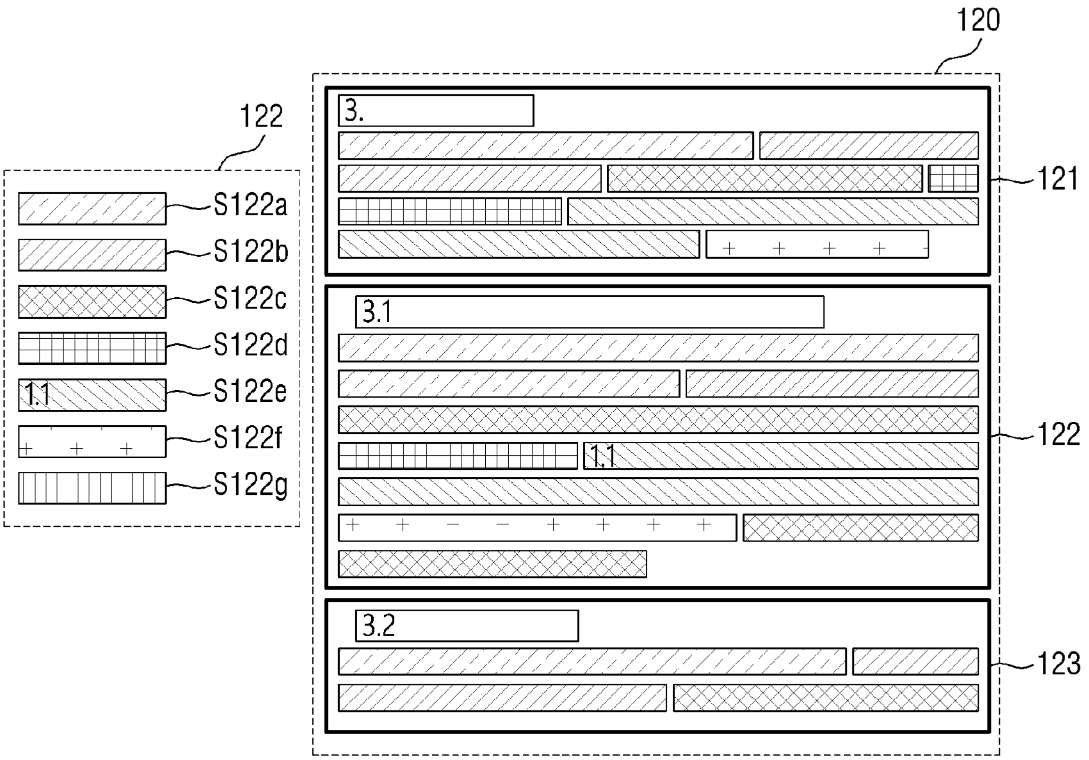

As illustrated in FIG. 12B, a first area of interest 121, a second area of interest 122, and a third area of interest 123 may be extracted from the second target page 120, and the second area of interest 122 may include a first sentence 122*a*, a second sentence 122*b*, a third sentence 122*c*, a fourth sentence 122*d*, a fifth sentence 122*e*, a sixth sentence 122*f*, and a seventh sentence 122*g*. In this case, the first sentence 122*a* may be a sentence belonging to the first class, and the second to seventh sentences 122*b* to 122*g* may be sentences belonging to the second class. In addition, in some cases, there may be the fifth sentence 122*e* including a number in a starting word of a sentence among the first to seventh sentences 122*a* to 122*g* included in the second area of interest 122.

In this case, although the fifth sentence 122*e* includes a number in the beginning word of the sentence, it may be a case in which a number is used to quote the contents for the title located in the front part, it may be a case in which a number is used to refer to legal provisions, and it may be a case in which it starts with a number due to typos not found in a preprocessing stage. That is, the fifth sentence 122*e* may be a sentence belonging to the second class, not a sentence belonging to the first class, even though a number is included in the beginning word of the sentence.

In this case, when the second area of interest 122 is extracted only based on the part-of-speech characteristics and the sentence characteristics, the fifth sentence 122*e* belonging to the second class is classified as the sentence of the first class, such that the area of interest including the first to fourth sentences 122*a* to 122*d* and the area of interest including the fifth to seventh sentences 122*e* to 122*g* may be extracted. That is, the second area of interest 122 including the first sentence 122*a* to the seventh sentence 122*g* may not be accurately extracted.

Accordingly, according to an exemplary embodiment of the present disclosure, a similarity between the first sentence 122*a* belonging to the first class and the fifth sentence 122*e* belonging to the second class may be determined, and any one of the first sentence 122*a* and the fifth sentence 122*e* may not be removed from the second area of interest 122 when it is determined that the similarity exceeds the reference value.

Furthermore, according to an exemplary embodiment of the present disclosure, a similarity between a plurality of sentences belonging to the same class as the fifth sentence 122*e* may be determined, and the fifth sentence 122*e* may not be removed from the second area of interest 122 when it is determined that the similarity exceeds the reference value.

Figure 13:
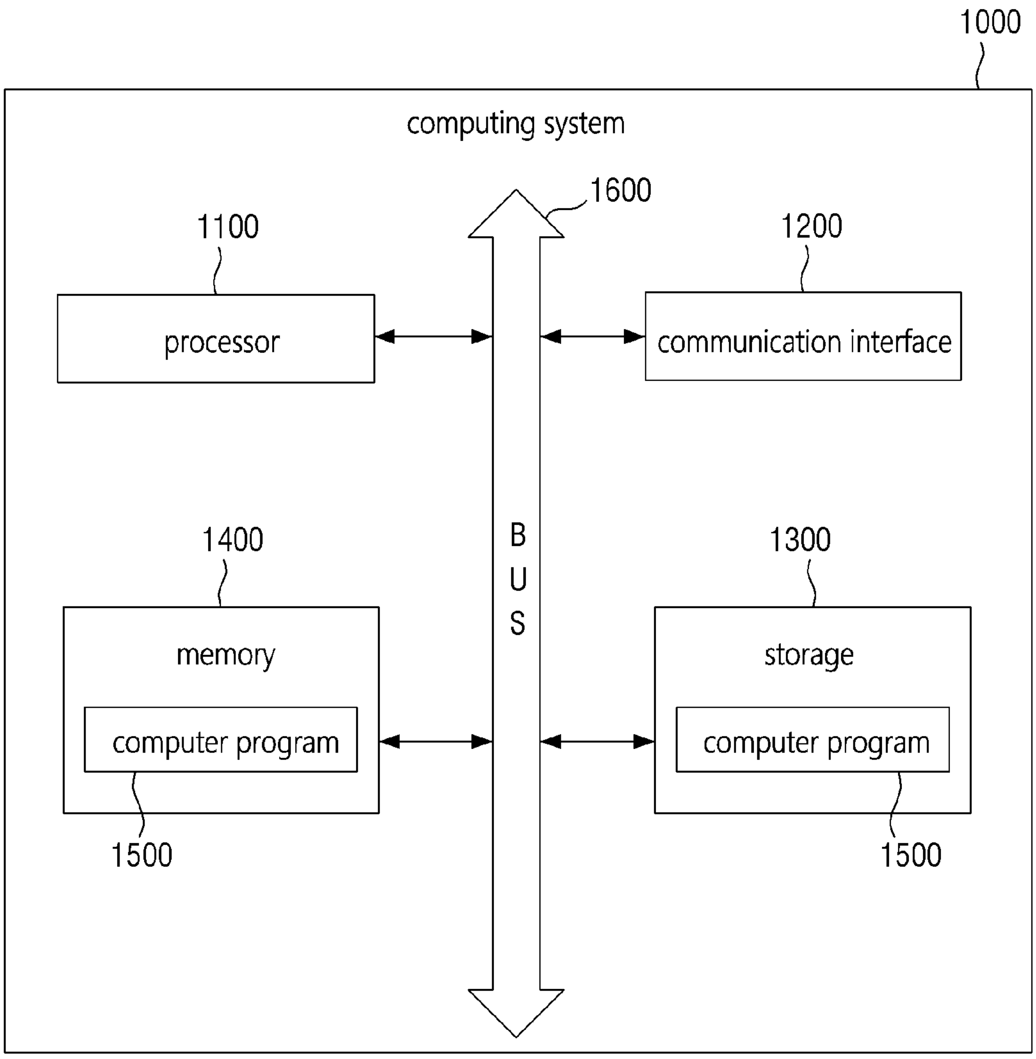
FIG. 13 is a hardware configuration diagram of a system for extracting an area of interest in a document according to some exemplary embodiments of the present disclosure.

FIG. 13 is a hardware configuration diagram of a system for extracting an area of interest in a document according to some exemplary embodiments of the present disclosure. A system 1000 for extracting an area of interest in a document illustrated in FIG. 15 may include one or more processors 1100, a system bus 1600, a communication interface 1200, a memory 1400 for loading a computer program 1500 executed by the processor 1100, and a storage 1300 for storing the computer program 1500.

The processor 1100 controls the overall operation of each component of the system 1000 for extracting an area of interest in a document. The processor 1100 may perform a calculation on at least one application or program for executing the methods/operations according to various exemplary embodiments of the present disclosure. The memory 1400 stores various data, instructions, and/or information. The memory 1400 may load one or more programs 1500 from the storage 1300 to execute the methods/operations according to various exemplary embodiments of the present disclosure. The system bus 1600 provides a communication function between components of the system 1000 for extracting an area of interest in a document. The communication interface 1200 supports internet communication of the system 1000 for extracting an area of interest in a document. The storage 1300 may non-temporarily store one or more computer programs 1500. The computer program 1500 may include one or more instructions in which the methods/operations according to various exemplary embodiments of the present disclosure are implemented. When the computer program 1500 is loaded into the memory 1400, the processor 1100 may perform the methods/operations according to various exemplary embodiments of the present disclosure by executing the one or more instructions.

In some exemplary embodiments, the system 1000 for extracting an area of interest in a document described with reference to FIG. 13 may be configured using one or more physical servers included in a server farm based on a cloud technology such as a virtual machine. In this case, at least some of the processor 1100, the memory 1400, and the storage 1300 among the components illustrated in FIG. 13 may be virtual hardware, and the communication interface 1200 may also be implemented as a virtualized networking element such as a virtual switch.

Embodiments of the present disclosure have been described above with reference to FIGS. 1 through 13, but it should be noted that the effects of the present disclosure are not limited to those described above, and other effects of the present disclosure should be apparent from the following description.

The technical features of the present disclosure described so far may be embodied as computer readable codes on a computer readable medium. The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. In concluding the detailed description, those skilled in the art will appreciate that many variations and modifications can be made to the example embodiments without substantially departing from the principles of the present disclosure. Therefore, the disclosed example embodiments of the disclosure are used in a generic and descriptive sense only and not for purposes of limitation.

The protection scope of the present invention should be interpreted by the following claims, and all technical ideas within the equivalent range should be interpreted as being included in the scope of the technical ideas defined by the present disclosure.

What is claimed is:

1. A method for extracting an area of interest in a document, the method being performed by a computing device and comprising:

extracting one or more target pages from a document, the document comprising a plurality of pages; and extracting an area of interest including a plurality of sentences from a target page based on a first part-of-speech characteristic and a sentence characteristic of the target page, wherein the first part-of-speech characteristic include one or more characteristics of a distribution ratio of a noun, a distribution ratio of a verb, and a distribution ratio of an adjective.

2. The method of claim 1, wherein the extracting of the one or more target pages includes:

generating a second part-of-speech characteristic and a page characteristic for each of the plurality of pages; and extracting the one or more target pages using the second part-of-speech characteristic and the page characteristic.

3. The method of claim 2, wherein the second part-of-speech characteristic include one or more characteristics of a distribution ratio of a noun, a distribution ratio of a number, a distribution ratio of a conjunction, a distribution ratio of a definite article, a distribution ratio of a verb, and a distribution ratio of an adjective.

4. The method of claim 2, wherein the page characteristic includes one or more characteristics of a number of words in a page and whether a number is included in a beginning word of a sentence within the page.

5. The method of claim 2, wherein the extracting of the one or more target pages further includes generating an image characteristic for each of the plurality of pages.

6. The method of claim 5, wherein the image characteristic includes one or more characteristics of a font size of a text area and an arrangement form of the text area in a page.

7. The method of claim 5, wherein the extracting of the one or more target pages using the second part-of-speech characteristic and the page characteristic includes:

classifying types of the plurality of pages by inputting the second part-of-speech characteristic, the page characteristic, and the image characteristic to a page classification model; and extracting the one or more target pages based on the types of the plurality of pages.

8. The method of claim 7, wherein the types of the plurality of pages include a cover page, a table of contents, and a body.

9. The method of claim 7, wherein the page classification model is a model learned using normalized values of frequency for each part-of-speech calculated based on the second part-of-speech characteristic, the page characteristic, and the image characteristic.

10. The method of claim 1, wherein the sentence characteristic includes one or more characteristics of whether a number is included in a beginning word of a sentence, whether a punctuation mark is present in the sentence, and a number of words in the sentence.

11. The method of claim 1, wherein the extracting of the area of interest includes:

classifying a plurality of sentences included in the target page into a plurality of classes by inputting the first part-of-speech characteristic and the sentence characteristic to a sentence classification model; and extracting the area of interest based on the plurality of classified classes.

12. The method of claim 11, wherein the extracting of the area of interest based on the plurality of classified classes includes extracting, as the area of interest, a combination of a sentence classified as a first class and a sentence classified as a second class through the sentence classification model.

13. The method of claim 12, wherein the first class is a title, and the second class is a body of the title.

14. The method of claim 12, further comprising:

determining a similarity between a first sentence and a second sentence included in the area of interest; and removing the second sentence from the area of interest based on a determination that the similarity between the first sentence and the second sentence is a reference value or less.

15. The method of claim 14, wherein the first sentence is a sentence belonging to the first class, and the second sentence is a sentence belonging to the second class.

16. The method of claim 14, wherein the first sentence and the second sentence are sentences belonging to a same class.

17. The method of claim 11, wherein the sentence classification model is a model learned using normalized values of a frequency of each part-of-speech calculated based on the first part-of-speech characteristic and the sentence characteristic.

18. A system for extracting an area of interest in a document, the system comprising:

at least one processor; and at least one memory configured to store instructions, wherein the instructions, when executed by the at least one processor, cause the at least one processor to perform:

extracting one or more target pages from a document, the document comprising a plurality of pages; and extracting an area of interest including a plurality of sentences from a target page based on a first part-of-speech characteristic and a sentence characteristic of the target page, wherein the first part-of-speech characteristic include one or more characteristics of a distribution ratio of a noun, a distribution ratio of a verb, and a distribution ratio of an adjective.

19. The system of claim 18, wherein the instructions further cause the at least one processor to perform:

removing any one of a first sentence and a second sentence from the area of interest based on a determination that a similarity between the first sentence and the second sentence belonging to the area of interest is a reference value or less.

* * * * *